United States Patent [19]

Brennan, Jr. et al.

[11] Patent Number: 4,674,113

[45] Date of Patent: Jun. 16, 1987

[54] FREQUENCY RESPONSIVE APPARATUS FOR READING A METER OVER A TELEPHONE LINE

[75] Inventors: William J. Brennan, Jr., Montgomery; Charles A. Cottle, Tallassee, both of Ala.

[73] Assignee: Neptune Water Meter Company, Tallahassee, Ala.

[21] Appl. No.: 655,712

[22] Filed: Sep. 28, 1984

[51] Int. Cl.$^4$ ............................................ H04M 11/06
[52] U.S. Cl. ................................... 379/107; 379/382
[58] Field of Search ................... 179/2 A, 2 AM, 5 R, 179/5 P, 6.3 R, 2 DP; 340/825.59

[56] References Cited

U.S. PATENT DOCUMENTS 3,103,647  9/1963  Dorros ........................... 340/825.59
3,868,640  2/1975  Binnie et al. .................... 179/2 AM

*Primary Examiner*—James L. Dwyer
*Attorney, Agent, or Firm*—Cooper, Dunham, Griffin & Moran

[57] ABSTRACT

There is disclosed a system for reading a meter, e.g., a utility meter, over a telephone line. The system includes circuitry for detecting when an input signal within a predetermined frequency range is present. The input signal is fed to two timing devices. One of the timing devices is set to produce a constant output when the input frequency is above the higher limit of the predetermined frequency range. The other device is set to produce a constant output when the frequency is above the lower limit of the same range. The outputs of both timing devices are connected to logic circuitry. The two timing devices are connected to the telephone line. When a signal in the selected frequency range is received from the telephone exchange, the frequency detector acknowledges to the exchange the receipt of that signal, and activates a recorder in a meter reading apparatus at the subscriber's location to transmit the recorded reading of the meter over the telephone line to the exchange, where it is suitably recorded. When the first timing device has a periodic output and the second does not, the logic circuitry produces an output indicating that the input signal is within the predetermined range of frequencies.

5 Claims, 6 Drawing Figures

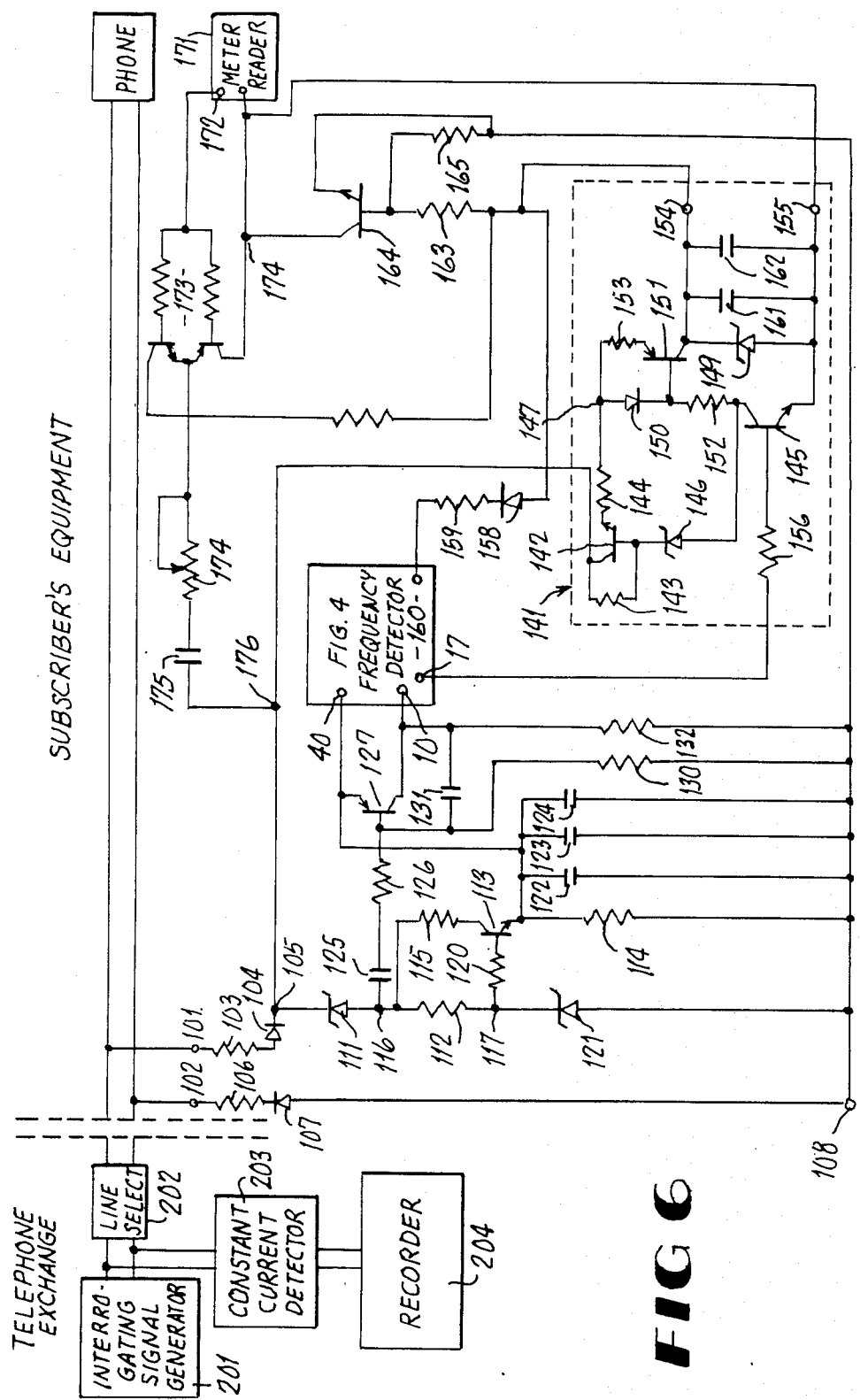

FREQUENCY RESPONSIVE APPARATUS FOR READING A METER OVER A TELEPHONE LINE

BACKGROUND OF THE INVENTION

This invention is particularly concerned with the detection of frequencies which are within a predetermined range. A common prior art method of detecting frequencies is to use a phase locked loop but there are a number of drawbacks to the utilization of such loops. One drawback is that rather high current consumption is required and another is that the signal being detected must be present for many cycles before the circuitry responds. Furthermore, the response time is lengthened considerably as the range of frequencies to be detected is narrowed about the center frequency of the phase locked loop.

BRIEF SUMMARY OF THE INVENTION

The present invention overcomes the above drawbacks. Its power consumption is greatly reduced as compared to a phase locked loop, since it does not employ a free running oscillator, but instead uses a very simple method of clocking the input pulses. The upper and lower limits of the range of frequencies to be detected can be set independently. The response time can be as short as two cycles of the input signal regardless of the size of the desired frequency range.

The invention comprises first timing means receiving the input signal and producing a periodic first control signal only when the frequency of the input signal is less than the preset upper limit of frequency being detected; second timing means receiving the input signal and producing a constant second control signal only when the frequency of the input signal is greater than the frequency at the lower limit of the range and a periodic signal when the input frequency is at or below that lower limit; and a logic circuit receiving both of these control signals and producing an output when the first control signal is periodic and the second control signal is constant.

A system of first and second counters receives the periodic ouput pulses from the first and second timing means, respectively. After a predetermined number of pulses of the selected frequency are received, the first counter produces an output pulse indicating that a signal of the selected frequency has been detected. That pulse is also effective to disable both counters from any further counting. The first counter is reset to zero when the frequency of the input signals is either above or below the selected frequency band. The second counter is reset to zero at every cycle of the desired frequency.

The invention includes two one-shot timers, each triggered by the leading edge of the input signal. A first one-shot timer has a period that is the same as the period of the highest selected input frequency. Each cycle of an input signal that is lower in frequency than this highest selected frequency will cause this one-shot to turn on for its time period, whereafter it will turn off. Consequently, this one-shot is continuously on only when the input frequency is above the selected upper limit.

The second one-shot timer has a period that is the same as the period of the lowest selected frequency. When the input signal is higher than this lowest selected frequency, the second one-shot will not turn off since the period of this one-shot is longer than the period of the signal triggering it. Each successive cycle of the input signal serves to keep this one-shot turned on. If the second one-shot oscillates on and off, then the input signal is lower in frequency than the selected range.

If the second one-shot stays on and the first one-shot oscillates on and off, then the input signal is within the desired range of frequencies. By setting the time constants of these one-shots appropriately, a wide range of frequencies can be detected.

The telephone exchange interrogates the various subscriber's lines in sequence by first applying a reverse polarity direct potential to each line. This reverse polarity potential supplies current to the frequency detector and the meter reading apparatus. An interrogating signal of the selected frequency is then put on the subscriber's line. When the detector circuit at the subscriber's premises detects this frequency, it applies a small constant current load to the telephone lines, thereby acknowledging to the exchange that the signal of the required frequency has been received. The meter reader at the subscriber's premises is then activated to supply to the telephone line the data recorded in the meter. As soon as the transmission is complete, it is repeated continuously until the telephone exchange is satisfied with the integrity of the transmission, whereupon the exchange returns the lines to their normal states.

A pre-existing telephone message, either incoming or outgoing, is effective to prevent operation of the meter reading apparatus both at the exchange and at the subscriber's premises. If a telephone message is initiated while the meter is being read, then, if the exchange does not get a proper transmission within a predetermined time, it will return the lines to their normal states. Telephone messages take precedence. Since the operation of reading the meter takes only a fraction of a second, there is no interference with the telephone messages.

BRIEF DESCRIPTION OF THE DRAWING FIGURES

FIG. 6 is a wiring diagram of a telephone meter reading system embodying the invention.

DETAILED DESCRIPTION OF THE INVENTION

FIGS. 1 AND 2

An input signal is applied to a terminal 10 which is connected in parallel to two timing means 11 and 12 which provide respective output signals at 13 and 14. These two outputs are connected to a logic circuit 15 which produces an output signal at a line 16 extending to an output terminal 17.

Figure 1:
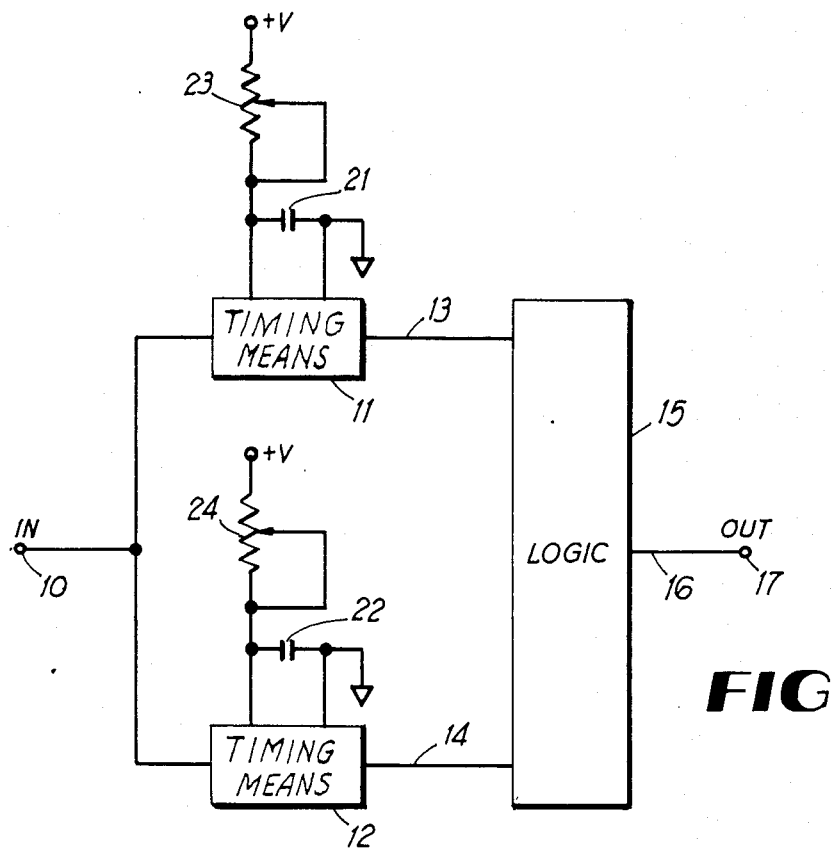
FIG. 1 is a block diagram illustrating a frequency detector constructed in accordance with the present invention.
Figure 2:
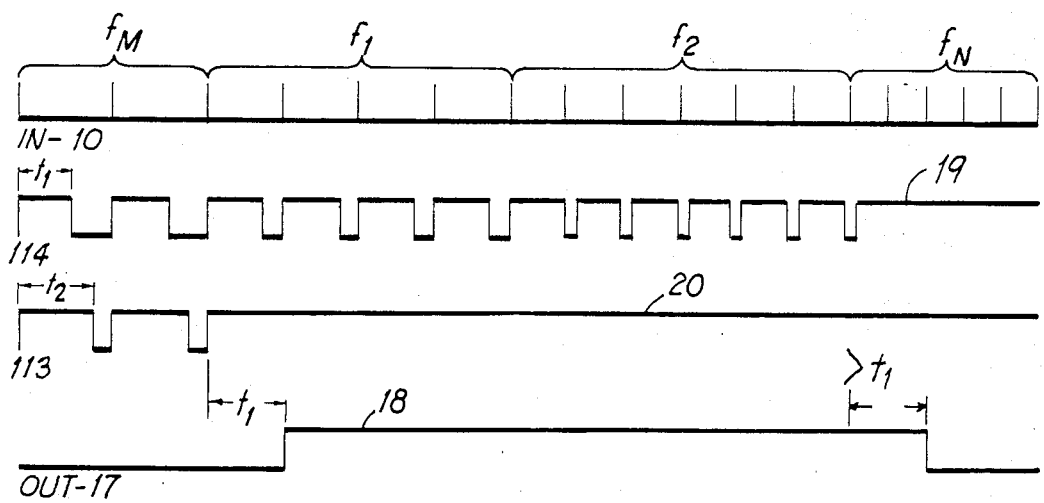
FIG. 2 is a waveform timing diagram related to FIG. 1.

The frequency detector shown in FIG. 1 is very simplified, but serves in conjunction with FIG. 2 to illustrate the basic principles of the frequency detector used in the invention.

In FIG. 2, the input signal IN-10 varies through four frequency ranges, respectively, fM, f1, f2 and fN. Frequency fM is below the lower limit f1 of the selected frequency range. f2 is the upper limit of that range. Frequency f1 has a period t1 which is equal to the output durations of the timing means 11. Frequency f2 has a period t2 which is equal to the output durations of the timing means 12.

When the input frequency is fM, i.e., below the lower limit f1 to be detected, periodic output pulses are present at each of the lines 13 and 14 as respectively at 113 and 114 in FIG. 2. The pulse duration of the output at 13 is t1, the period of the frequency f1 which is at the lower limit of the frequency band being detected. The duration of the pulses at the output 14 is t2, the period of the frequency f2 which is at the upper limit being detected.

When the input frequency increases above fM to a value within the range between f1 and f2, then the output signal at 14 becomes constant for a period of time greater than t1, as is indicated at 20 in FIG. 2, and an output signal pulse 18 appears at terminal 17. The pulse 18 is produced by the logic circuit 15 in response to the presence of a steady output signal at 14 and a periodic signal at 13. This condition persists for all input frequencies from f1 to f2. When an input signal fN appears, the output at 14 becomes constant as is indicated at 19. After a period of time greater than t1, the output signal pulse 18 stops, substantially as shown in the line "OUT-17". At any frequency fN higher than the frequency f2, the output signals at 13 and 14, represented by 19 and 20 in FIG. 2 remain high. At any subsequent time that the input terminal 10 receives a frequency between f1 and f2, the output signal 18 reappears at terminal 17.

The timing means 11 and 12 may be one-shot timers (monostable circuits) and may be constructed of CMOS integrated circuits. Other equivalent timing means may be used. The pulse durations of the output pulses at 13 and 14 are controlled by respective capacitors 21 and 22 and their respectively associated variable resistors 23 and 24. The RC value of the resistor 23 and capacitor 21 is adjusted to determine the time duration t1 which determines the frequency f1 whereas the RC value of the resistor 24 and capacitor 22 determines the time duration t2. These frequencies may therefore be individually adjusted and selected to cover as wide or as narrow a band of frequencies as desired.

FIG. 3

Figure 3:
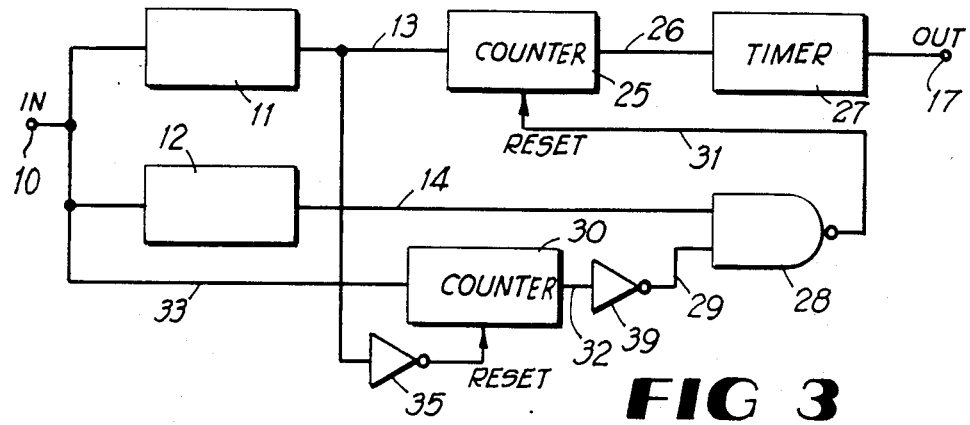
FIG. 3 is a block diagram of another frequency detector embodying the invention.

FIG. 3 illustrates one form which the logic circuit 15 may take. As shown, a counter 25 receives the output signals at 13 from a one-shot timer 11 and counts them. Upon reaching a predetermined count, the counter 25 produces an output at 26 which triggers the timer 27 to produce an output signal at 17 for a predetermined period of time. The counter 25 is prevented from counting during times when the one-shot timer 12 is producing periodic output signals. The output of timer 12 is connected by conductor 14 to one input of a NAND gate 28. The other input of NAND gate 28 is from the inverted output of a second counter 30. The counter 30 resets the counter 25 during bursts of high frequency input pulses 10. However, during low frequency input at 10, the one-shot timer 12 produces periodic outputs at 14, the output 31 from the NAND gate 28 goes high at a falling voltage of each output pulse 14, thereby resetting the counter 25 so that it cannot accumulate low frequency counts. As soon as the output 14 goes high and remains constant, the output at 31 goes low to allow the counter 25 to accumulate counts so long as the signal at 13 is periodic.

During a high frequency burst of input signals at 10, both the signals at 13 and 14 will be high and will remain so. If the counter 30, which is connected by conductor 33 to the input signal terminal 10, accumulates enough counts from such a burst, its output at 32 will go high to produce a high output at the line 31, thus, resetting the counter 25. This prevents the counter 25 from accumulating counts during two different periods in which the input frequency at 10 is within the prescribed range. The counter 30 is reset through the inverter 35 whenever the signal 13 goes from high to low.

FIGS. 4 AND 5

Figure 4:
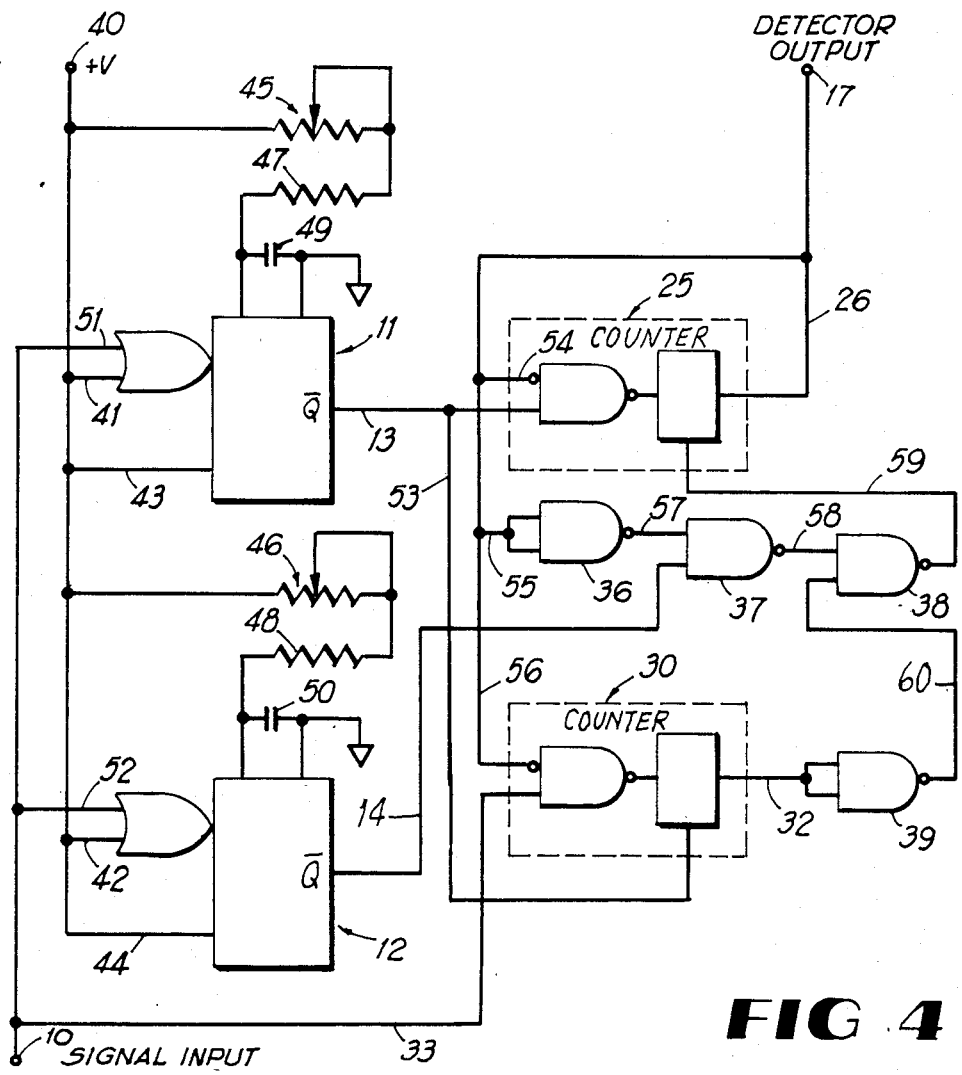
FIG. 4 is a circuit diagram illustrating a preferred embodiment of a frequency detector embodying the invention.
Figure 5:
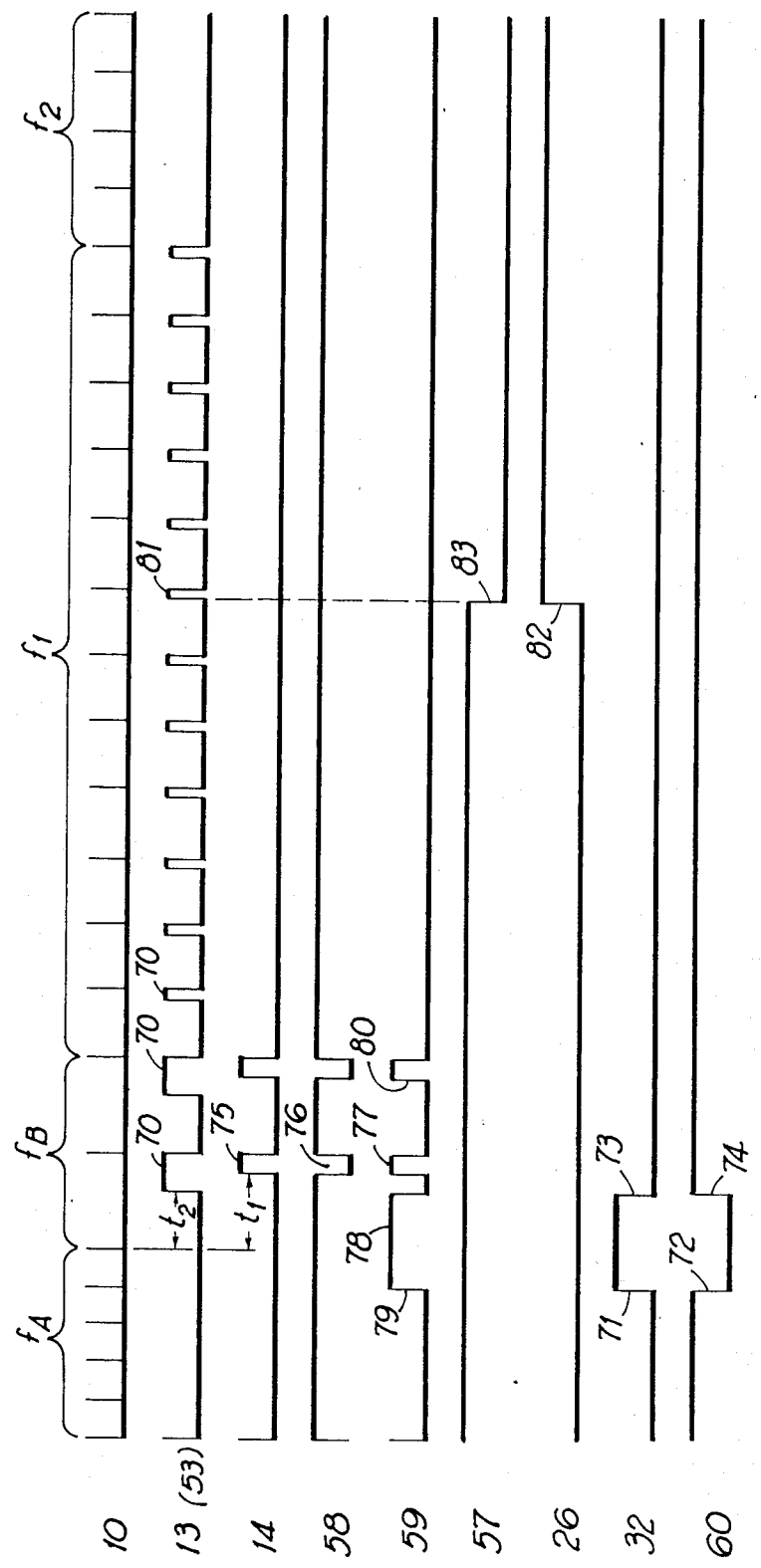
FIG. 5 is timing diagram related to FIG. 4.

In the preferred embodiment of a frequency detector, as shown in FIG. 4, negative logic is used, which is contrary to the operation as described in connection with FIGS. 1-3. As shown in FIG. 5, the control signals at the lines 13 and 14 go negative when the one-shot timers 11 and 12 respectively are triggered. The $\overline{Q}$ outputs of the timers 11 and 12 are respectively connected to the lines 13 and 14.

A positive voltage input terminal 40 is connected at lines 41 and 42 to first inputs of each of the timers 11 and 12 and over lines 43 and 44 to record inputs of those timers. The positive voltage input at 40 is also connected to two variable resistors 45 and 46 which are in series respectively with fixed resistors 47 and 48. The resistor chain 45 and 47 is connected to an input of timer 11, whereas the resistor chain 46 and 48 is connected to an input of timer 12. A capacitor 49 is connected between an input of timer 11 and ground. A capacitor 50 is connected between an input of timer 12 and ground.

The signal input terminal 10 is connected at line 51 to an input of timer 11 at line 52 to an input of timer 12 and over a line 33 to an input of counter 30. The output of timer 11 is connected by line 13 to an input of counter 25. The output of timer 12 is connected by line 14 to an input of NAND gate 37. The conductor 13 is connected over the line 53 to a reset input of the counter 30. The signal at the output terminal 17 is connected through a conductor 54 to an input of the counter 25, through conductor 55 to an inverter 36 and at conductor 56 to an input of counter 30. The output of the inverter 36 is connected to an input of the NAND gate 37 at a conductor 57. The output of the NAND gate 37 is connected to a conductor 58 to an input of a NAND gate 38 and the output of the NAND gate 38 is connected over a conductor 59 to the reset input of the counter 25. The output of an inverter 39 is connected to the other input of the NAND gate 38 over a conductor 60. The output line 32 of counter 30 is connected to the input of the inverter 39.

FIG. 5 illustrates the idealized waveform diagrams at the various conductors in FIG. 4. Each waveform line has been given the same reference numeral. as its corresponding conductor in FIG. 4. For input pulses fA which are higher in frequency than the band to be detected, both of the control signal lines at 13 and 14 go low and stay low. When a frequency fB is encountered, which is a lower frequency than the band (f1-f2) to be detected, the control signal at 13 stays low for a period of time t2 which is the period of the frequency f2 and the line 14 stays low for a period of time t1, equal to the period of the frequency f1, subsequent to the first pulse of the series fB as is illustrated. The leading edges of the positive going pulses indicated by reference character 70 at the control signal line 13 reset the counter 30. In FIG. 5, the counter 30 is set to count the first five pulses of the frequency fA so that at the fifth pulse of fA, the output of counter 30 at 32 goes high as indicated by the reference character 71. The output of the inverter 39 at conductor 60 correspondingly goes low as indicated by the reference character 72. This condition persists until the first pulse 70, due to the periodic nature of the control signal at 13, whereupon the counter 30 is reset, the line 32 returns as indicated at 73 to its normally low condition and, correspondingly, the output of the inverter 39 at the conductor 60 returns to its normal high state as indicated at 74. The output of the counter 25 at the conductor 26 is normally low as is indicated to enable both of the counters 25 and 30 and to cause the potential at the conductor 57 normally to be high. Thus, when the pulse 75 on the control signal line 14 goes high, the signal on the conductor 58 goes low as indicated at 76 to produce a high output at the conductor 59 as indicated by the pulse 77, the leading edge of which resets the counter 25. However, in the particular case as shown, the output at the conductor 32 due to the five count during the frequency fA has also produced a pulse 78 at the conductor 59, the leading edge 79 of which had previously reset the counter 25. Thus, during any high frequency burst such as is shown in FIG. 5 and fA, when the counter 30 reaches its preselected count, any previously accumulated count in the counter 25 is cancelled. Thus, successive counts within the frequency band which are interrupted by a high frequency burst which is fA are not accumulated but only those subsequent to the burst.

When the lower frequency f1 threshold is reached as indicated in FIG. 5, the control signal at the line 14 goes low and stays low since the pulse duration time t1 is equal to the period of f1. The counter 25 was last reset by the leading edge 80 of a pulse at the line 59 and, assuming that the counter 25 is set to count seven pulses 70 on the control signal line 13, such seventh pulse 81 will cause the output line 26 to go high as indicated at 82 and, correspondingly, the two counters 25 and 30 are no longer enabled and the output of the inverter 36 at conductor 57 goes low as indicated at 83. Thus, the output at line 26, which is the same as the detector output at 17, goes high and remains high as indicated. This condition will thereafter prevail even if the upper limit of the frequency range f2 is input to the device, substantially as is shown. The reason for this, is that the output of the counter 25 and consequently output of the detector is latched back to prevent any further counting irrespective of the condition of the control signal lines 13 and 14.

The frequency detector of FIG. 4 can be used as part of an apparatus that transmits utility meter readings over telephone lines. The apparatus is connected to the utility meter and is powered from the telephone line when tip and ring are reversed (ring positive). The detector responds to a pulsed signal of a certain frequency that indicates that the meter readings should be transmitted. After that pulsed signal is detected, the data is transmitted over the phone line. When tip is positive (normal telephone operation), power is removed from the frequency detector and other parts of the meter reading transmitting apparatus.

The frequency detector of FIG. 4 may be used in other applications, in which the detector circuit is reset by other means after the desired frequency has been detected, thereby enabling it to receive such a signal again. Such a result may be achieved by many methods, such as having the detector output trigger a timer which would reset the first counter after a short period of time, or having the detector output itself reset the first counter. Different counts of the first counter could also be employed to produce this function. For example, a count of seven could indicate that the desired tone had been detected and a count of eight could serve to reset the first counter.

If continuous monitoring of the input signal is desired, so as to detect when the signal is no longer within the desired range of frequencies, the circuit in FIG. 4 could be used, omitting the components that latch the detector when the first counter 25 reaches terminal count. This would allow frequencies that are too high, too low, or too noisy to reset the first counter, even after it reached terminal count.

The invention described herein may be constructed using other types of circuits. TTL, discrete logic, etc. may be substituted for the CMOS used here. The entire frequency detector may be fabricated on a single integrated circuit. The timers may be clocked using the clock on enable lines. Reset signals may be "zeros" instead of "ones". The one-shots may be triggered by trailing edges instead of leading edges. The one-shots may be replaced entirely by synchronous or asynchronous logic that produces similarly timed output pulses, thereby allowing a microprocessor to set, (and change) the various time constants. Part or all of the invention may even be implemented by programming an appropriate microprocessor.

One feature of this invention is a multistage power system that provides uniform current drain and good voltage regulation virtually independent of the resistance of the telephone line. Conventional regulator circuits cannot provide both the 12 ma "on" current required for the telephone line and the 4.7 volt regulated voltage required by the microprocessor meter reader, because of the wide range of telephone line resistance actually encountered in the field. Two independent regulator systems are used to avoid this problem. The first is a standard regulator circuit which powers the detector circuit. When the detector detects the presence of the desired frequency, it activates a second regulator system which simultaneously provides the current drain specified and the 4.7 volts required by the microprocessor meter reader. It does this by cascading a preregulator circuit with a constant current regulator. The constant current regulator allows the microprocessor to use all the current available, if required. Any excess current is shorted to ground.

Another feature of the invention is circuitry that isolates the telephone from the water meter reader when the telephone is in normal use. The water meter reader could be shorted out if water leaked into it. This would cause noise, primarily 60 cycles hum, to be produced on the telephone line. To prevent this from happening, the power and the ground lines from the water meter reader are isolated with transistor switches which are activated only after the desired signal frequency has been detected.

FIG. 6

The input terminals connected to the telephone lines are shown at 101 and 102. The terminal 101 is connected through a resistor 103 and a diode 104 to a junction 105. The terminal 102 is connected through a resistor 106 and a diode 107 to a junction 108. The diodes 104 and 107 block the normal polarity of current of the telephone lines from the meter reading apparatus shown in this figure.

When this circuit is to be interrogated over the telephone line, that polarity is reversed and the voltage is approximately doubled to about 100 volts. The junctions 105 and 108 then have essentially 100 volts impressed across them. Junction 105 is positive. Connected in series between junction 105 and 108 are a Zener diode 111, a resistor 112 and another Zener diode 12. A common junction 116 of Zener diode 111 and resistor 112 is connected through a resistor 115 to the collector of a transistor 113. The base of transistor 113 is connected through a resistor 120 to the junction 117 between resistor 112 and Zener diode 12. The emitter of transistor 113 is connected through a resistor 114 to junction 108. A plurality of filter capacitors 122, 123 and 124 are connected in parallel between the emitter of transistor 113 and the junction 108.

A capacitor 125 and resistor 126 are connected in series between junction 116 and the base of a transistor 127. A resistor 130 is connected between the base of transistor 127 and the junction 108. A capacitor 131 is connected between the base and the collector of transistor 127. A resistor 132 is connected between the collector of transistor 127 and the junction 108. The transistor 113 serves as a voltage regulator and transistor 127 serves to shape the square waves supplied to one-shot timers 11 and 12 of FIG. 4. The capacitor 125 blocks the direct currents at the telephone lines from the transistor 127 and hence keeps those direct currents from one-shot timers.

There is connected between junction 105 and junction 108, a voltage regulator circuit, shown generally at 141 including a transistor 142. The collector of transistor 142 is connected to junction 105. A resistor 143 is connected between the collector and the base of transistor 142. A current limiting resistor 144 connected between the emitter of transistor 142 and a second stage of the voltage regulator which includes transistors 145 and 151. The base of transistor 142 is connected to the collector of transistor 145 through a Zener diode 146. The resistor 144 is connected to a junction 147, which is in turn connected through a diode 150 to the base of transistor 151. The collector of transistor 145 is connected through a resistor 152 to the base of transistor 151. The junction 147 is connected through another resistor 153 to the emitter of transistor 151. The collector of transistor 151 is connected to a junction 154. The emitter of transistor 145 is connected to a junction 155. The base of transistor 145 is connected through a resistor 156 to an output terminal 17 of the frequency detector generally shown at 160.

The junctions 154 and 155 are the power output terminals of the voltage regulator including the transistors 142, 145 and 151. A pair of filter capacitors 161 and 162 and a Zener diode 149, are connected in parallel across those output terminals 154 and 155. Terminal 154 is connected through a resistor 163 to the base of a switching transistor 164. The base of that transistor is also connected through a current limiting resistor 165 to the junction 108. The emitter of transistor 164 is connected directly to the junction 108. The collector of transistor 164 is connected to the ground potential output terminal of a meter reading circuit generally shown at 171, which may be similar to that shown in the Kullmann, et al., U.S. Pat. No. 4,085,287. During normal telephone operation, transistor 164 isolates the ground terminal of meter reader 171 from the telephone ground. During meter reading, transistor 164 connects the two grounds together. A plurality of meter reading devices may be connected to the collector of transistor 164 and may be connected to junctions 154 and 155 for the purpose of reading meters successively over a single pair of telephone wires.

Terminal 154 is connected through a diode 158 and a resistor 159 to a disabling input of the frequency detector 160, so that once a frequency in the desired range is detected, the counters in the detector are cut off.

OPERATION

The transistor 113 is normally off when the DC voltage at the input terminals 101 and 102 has its normal polarity. When that voltage is reversed, to initiate operation of the frequency detector 160, the Zener diodes 111 and 121 prevent the transistor 113 from turning on until the reverse voltage exceeds a predetermined level, which, for example, may be somewhat more than the voltage of the telephone circuit. When that voltage is exceeded, the transistor 113 turns on and supplies current to transistor 127 and to the frequency detector 160. A signal is then supplied to terminals 101 and 102 at a frequency which is distinctly different from the frequency of the ringing currents commonly used on telephone lines. It is presently preferred to use a signal of 680 Hertz. The frequency detector is set to detect any incoming signals having a frequency between 400 and 800. Such signals are not effective to ring the bells on the telephone circuits which commonly operate at 25 Hertz. When that interrogating frequency appears at the terminals 101 and 102, it is transmitted through the DC blocking capacitor 125 to the voltage regulator transistor 127 which supplies signals of that frequency to the one-shot timers 11 and 12 of the frequency detector 110. If the correct frequency is detected, a signal is produced at the output terminal 17 of detector 160 and is supplied to the base of transistor 145, thereby turning on that transistor and supplying a current of substantially constant amplitude to the voltage regulator 151 and the Zener diode 149. This produces a small but steady drain of approximately 12 milliamps on the telephone lines 101 and 102, and serves to indicate to the telephone exchange apparatus that the frequency detector 141 has responded and is supplying current to the circuits for the meter reader 171. The meter reader 171 then sends its output signals through terminals 172 and 155, the latter being connected directly to terminal 108. The signal appearing at terminal 172 and 155 is amplified by a push-pull amplifier 173, whose output is transmitted through a variable resistor 174 and a capacitor 175 to a junction 176 which is in turn connected through diode 104 and resistor 103 to the input terminal 101. The signal representing a reading of the meter 171 is thereby transmitted back through the telephone lines connected to terminals 101 and 102. The terminal 102 is connected to junction 174 through the transistor 164.

After the 680 Hertz interrogating signal appears at terminals 101 and 102, as soon as it has activated the current supply circuit including transistors 145 and 151, then its 12 ma. current appears on the telephone lines and is effective to terminate the supply of the 680 Hertz signal from those lines. Alternatively, the 680 Hertz signal may be supplied for a predetermined time and a check then made for the existence of the 12 ma current. If that current is found, then the record from the meter reading device 171 is transmitted over the telephone lines to the central office. The current value of 12 ma. is not critical. It may be set at any convenient value between about 12 ma. and about 30 ma. A value of 15 ma. is presently preferred.

Apparatus at the telephone exchange includes an interrogating signal generator 201 connected to a line selecting means 202, which sequentially connects the generator 201 to the telephone lines at the exchange. A constant current detector 203 is connected to the telephone line and has its output connected to a recorder 204.

When the interrogating signal is generated, generator 201 transmits to the meter reading apparatus at the subscriber's station, the meter reading apparatus responds by transmitting pulses indicative of the quantity recorded on the meter reader 171 over telephone lines, where it passes through the constant current detector 203 and is recorded by a suitable recorder 204.

The recorder 204 checks the data which it receives as to its integrity by various means. For example, it may check the number of the meter which is part of the transmitted data. It may check the data for arithmetical errors. Other checks may be made. When the recorder 204 is satisfied as to the integrity of the data, it returns the voltage applied to the telephone line by the exchange to its normal polarity and value, which usually means that the ring voltage is zero and the tip voltage is +50. The meter reader 171 is arranged to keep repeating its output data as long as the telephone line potential is maintained at its reverse value, i.e., tip voltage about +100 and ring voltage zero.

What is claimed is:

1. Apparatus for reading stored data over a telephone line, including:
    a. means for detecting a reversal of the normal polarity between the conductors of said telephone lines;
    b. frequency detecting means for detecting a signal whose frequency is within a predetermined range;
    c. means responsive to the detection of said reverse polarity to supply energy to said frequency detecting means;
    d. means responsive to the detection of a signal whose frequency is within said predetermined range by said frequency detecting means to establish a constant current flow on the telephone line;
    e. means for translating said stored data into pulses transmittable over the telephone line; and
    f. means for activating said translating means in response to said constant current flow to transmit said pulses over the telephone line.

2. Apparatus as in claim 1, including:
    a. data storage apparatus;
    b. means responsive to said constant current flow on the telephone line for supplying to said data storage apparatus a potential which remains substantially constant over a wide range of variation of resistance of the telephone line and causes the data storage apparatus to store said pulse transmitted over the telephone line.

3. Apparatus for connection between data storage means and telephone line conductors having a potential difference thereacross, comprising:
    a. means response to an interrogating signal from the telephone line to establish a constant current flow across the telephone line conductors;
    b. means responsive to said constant current flow for suppling to the data storage means a substantially constant potential which is unaffected by variations in the potential across the telephone line conductors; and
    c. data translating means responsive to said constant potential for transmitting the data stored in said storage means over the telephone line conductors.

4. Apparatus for transmitting stored data from a remote location over telephone line conductors having a DC potential difference thereacross and selectively carrying an AC interrogation signal, comprising:
    a. power-up means responsive to a reversal of said potential difference across the telephone line conductors to supply energy derived from the telephone line;
    b. frequency detecting means operative in response to energy supplied by the power-up means for detecting whether an AC signal whose frequency is within a predetermined frequency range is present on the telephone line;
    c. constant current means operative in response to energy supplied by the power-up means and to detection by said frequency detecting means of the presence on the telephone line of an AC signal whose frequency is within the predetermined range, to establish and maintain a constant current flow across the telephone line conductors; and
    d. data translation means operative in response to said constant current flow across the telephone line conductors for translating data stored at the remote location into pulses transmittable over said telephone line conductors and for transmitting said pulses over the telephone line.

5. Apparatus as in claim 4 comprising:
    a. data storage means at the remote location, storing data to be translated by said data translation means;
    b. means responsive to said constant current to supply a constant potential to said data storage means and said data translating means; and
    c. means for connecting the data storage means and the data translating means to permit the data translation means to translate data from the data storage means into said pulses but to provide electrical power isolation of the data storage means from the remainder of said apparatus.

* * * * *